Aug. 31, 1948. T. J. KAVANAGH 2,448,314
APPARATUS FOR CHECKING THE EXTERNAL
DIAMETERS OF ANNULAR OBJECTS
Filed Nov. 29, 1944
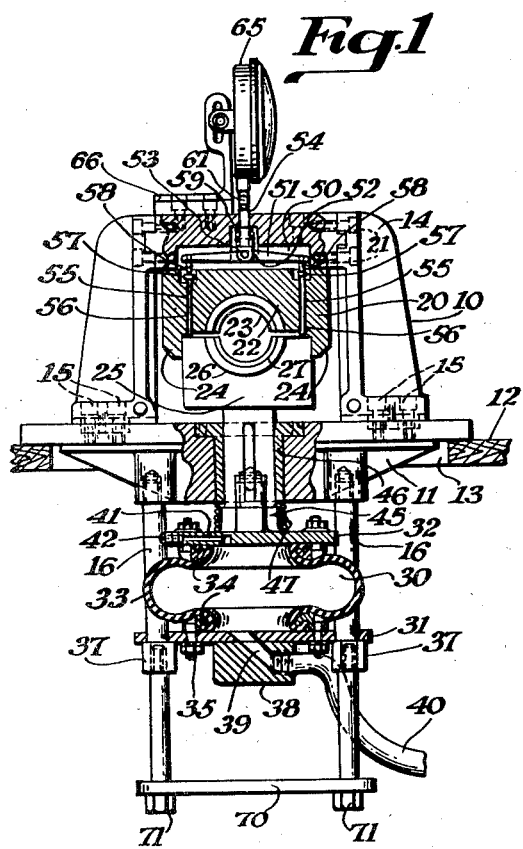
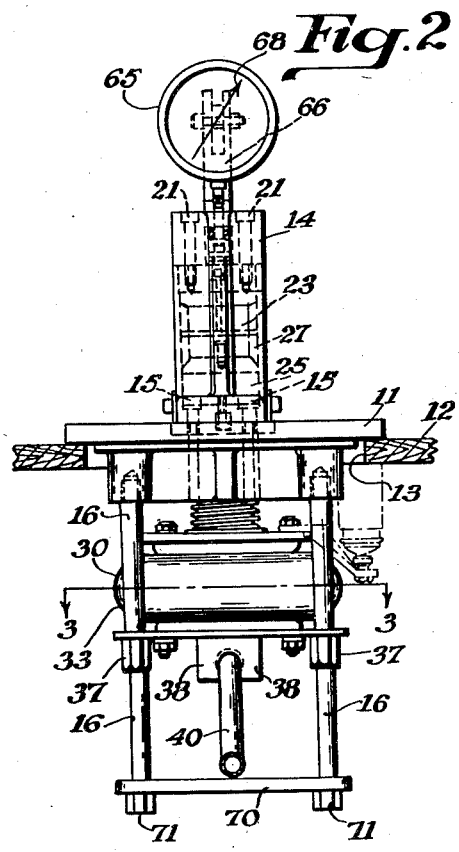
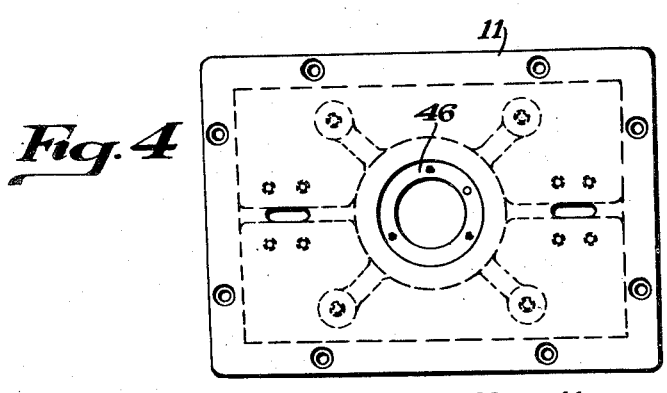
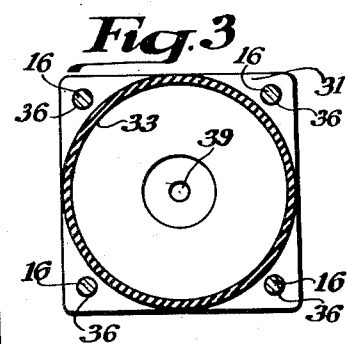
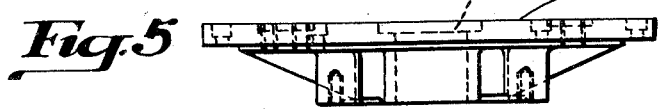
INVENTOR.
THOMAS J. KAVANAGH.
BY Fay, Golrick, Chilton & Ohler.
Attorneys.

Patented Aug. 31, 1948

2,448,314

UNITED STATES PATENT OFFICE 2,448,314

APPARATUS FOR CHECKING THE EXTERNAL DIAMETERS OF ANNULAR OBJECTS

Thomas J. Kavanagh, Cleveland Heights, Ohio, assignor to The Cleveland Graphite Bronze Company, Cleveland, Ohio, a corporation of Ohio Application November 29, 1944, Serial No. 565,661

6 Claims. (Cl. 33—178)

1

The present invention relates to apparatus for determining accurately the diameters of any open ended articles and particularly of bushings or bearings.

In the manufacture of bushings or bearings, it is necessary to know whether or not the diameter of the bushing or bearing is such that it can be secured in the housing, or the like, in which the bushing or bearing will ultimately be disposed. One method of checking such articles consists in applying a known pressure to the article by two members movable relative to one another and which are normally separated during the application of such pressure. The space between the members is measured while the pressure is applied and in this way it can be determined whether or not the diameter of the bushing or bearing is correct.

In apparatus heretofore used, the force was applied manually and the operator was required to read two gauges in checking each article, one gauge to determine whether or not the proper force was applied and the other gauge to determine the spacing of the two members.

An object of the present invention is to provide apparatus for checking such articles in which the force is applied by a fluid operated power element comprising a chamber having a flexible wall, the pressure on the wall being transmitted to one of the movable members. Thus, when a known fluid pressure is directed into the power element a predetermined, known force will always be applied to the element.

Another object of the present invention is to provide an apparatus for applying contracting pressures on bushings, or the like, so that the pressures can be accurately applied and the space between the pressure members quickly measured.

Another object of the invention is to provide a checking apparatus for bushings and the like which can be operated with a minimum of effort by the operator.

Other objects and advantages of the invention will be apparent from the following description of a preferred form of the invention, reference being had to the accompanying drawings wherein:

Fig. 1 is a view in elevation and partly in section of a bushing checking apparatus;

Fig. 2 is a side view of the apparatus shown in Fig. 1;

2

Fig. 3 is a view in section taken on line 3—3 of Fig. 2;

Fig. 4 is a plan view of the base member of the apparatus shown in Fig. 1; and

Fig. 5 is a view in elevation of the base shown in Fig. 4.

Referring to the drawings, a bushing checking apparatus is shown generally at 10. The apparatus includes a base member 11 which may be secured to a bench 12 by suitable means, not shown, and having the lower part thereof depending in an opening 13 formed in the bench. An inverted yoke-like member 14 is attached to the base 11 by bolts, indicated at 15. Four guide rods 16 are attached to the lower side of the base 11, by threading the rods into the base.

A block 20 is secured to the member 14 by bolts 21. The block 20 has a recess 22 formed therein, which recess is substantially semi-cylindrical, the width of the opening being slightly greater than the depth, as viewed in Fig. 1. Adapter members, one of which is shown at 23, preferably formed of hardened steel and substantially semi-cylindrical are adapted to be attached in the recess 22 by bolts, not shown. Block 20 has guide jaws 24 formed at each end thereof, which jaws guidingly receive a block 25 which is movable relative to the block 20. The block 25 has a recess 26 formed therein which is similar to the recess 22, and adapter members, one of which is shown at 27, are adapted to be attached in the recess 26 by bolts, not shown. The blocks 20 and 25 have flat confronting surfaces and when these surfaces are together, the blocks and the adapter members 23 and 27 form a cradle for receiving bushings or the like, to be checked, which cradle is similar to the ultimate housing for the bushing, or the like. The adapter members are formed so that the width of the tubular receptacle, or cradle, is slightly greater than the height, as viewed in Fig. 1. Thus, when a cylindrical bushing, or the article to be checked, is placed between the members 23 and 27 and the block 25 is urged toward block 20 a slight space will be present between the confronting surfaces of the blocks 20 and 25, providing the outside diameter of the article being checked is not substantially less than that acceptable. Adapter members having different inside dimensions can be inserted in the blocks 20 and 25 for checking different size articles.

The block 25 is moved by a power element, indicated generally at 30. The power element 30 comprises a rigid end plate 31, a second rigid end plate 32 and a flexible sleeve 33 hermetically joined at opposite ends with the plates 31 and 32 by collars 34 which are bolted to the plates 31 and 32 by bolts 35. The sleeve 33 is preferably formed of a flexible rubber which may have a cord fabric embedded therein. In any event, the sleeve 33 should be formed of flexible material which is impervious to certain gases or liquids which are suitable for inflating the power element, and the flexibility of which is unaffected by changes in temperature or atmospheric conditions. The plate 31 has four openings 36 formed therein through which the guide rods 16 extend. The end plate 31 is slidable along the guide rods 16 and movement of the plate 31 in the downward direction is limited by stops 37, one of which is attached to each guide rod. The stops 37 are located approximately at the middle portion of the guide rods. A block 38 is attached to the under side of plate 31 by suitable means, not shown, and a passage 39 is formed through the block 38 and plate 31 so that an air hose 40 can be attached to the block 38 for directing air into the power element 30. In the preferred form of the invention, air is used for expanding the power element 30, but it is to be understood that other fluids, such as gases or liquids, could be employed. In the event a liquid is used in the power element air can be bled from the power element through a passage 41 formed in the plate 32. Normally the passage 41 is closed by screw plug 42. The hose 40 is connected with a suitable source of air pressure, not shown, and a suitable valve, also not shown, may be provided for controlling the flow of air to and from the power element. Preferably, a pressure regulator, not shown, is provided in the air system for supplying a predetermined, fixed air pressure to the power element 30. Such pressure regulators are well known in the art. The power element just described will exert a definite predetermined pressure during repeated operations of the checking apparatus because the only friction present is that in the walls of the sleeve 33 and this friction is slight and unchanging during changes in ambient temperature.

The block 25 is connected with the power element 30 by a rod 45, one end of which rod is attached to the block 25 and the opposite end to the plate 32. The rod 45 extends through a sleeve 46, which is preferably formed of hardened steel, and which sleeve is suitably attached in an opening extending through the base 11. A coil spring 47 is interposed between the bottom of the base 11 and plate 32 for urging the plate 32 downwardly. Thus, when air pressure is directed into the expansible chamber, or power element 30, the block 25 is moved upwardly toward the block 20, and by maintaining the air pressure at a predetermined fixed value, by use of the pressure regulator, a definite contracting pressure can be applied to a bushing cradled in the members 23 and 27.

In order to readily determine the distance between the confronting faces of the blocks 20 and 25, the member 14 has a recess 50 formed therein and a lever 51 is carried within the recess by a forked pivot member 52, the lever 51 being carried between the tines of the fork member 52 by a pin 53 extending through the tines and the lever. The fork member 52 has a stem 54 that extends upwardly through an opening in the member 14 and above the top surface thereof. The block 20 has passages 55 therein and a link or pin 56 extends through each passage 55 for interconnecting the ends of the lever 51 with the top face of the block 25. Each pin 56 has a head 57. The lever 51 is provided with depending pins 58 which engage the heads of the pins 56. A coil spring 59 surrounds the stem 54 and is intermediate the member 14 and pivot member 52 for urging the lever 51 and the pins 56 downwardly for causing the pins 56 to follow the block 25. By this arrangement it will be seen that the fork member 52 will move in a vertical direction according to the mean distance between the confronting faces of blocks 20 and 25.

A suitable gauge 65 for indicating movement is mounted on the top of member 14 by a bracket 66 attached to the member 14. The gauge 65 may be any indicating gauge known to the art and it is provided with a movable plunger 67 that engages the end of stem 54 so that the vertical movement of the forked pivot member 52 will be indicated by the gauge. In the present embodiment of the invention the gauge 65 is provided with a pointer 68 which swings about a pivot, not shown, and cooperates with indicia on a dial, not shown, for indicating the extent of movement of the plunger 67. It is to be understood, however, that any suitable type of gauge could be employed, for example, a gauge in which one light would indicate a certain amount of movement in one direction, a second light indicating movement within a desired range, and a third light indicating movement below the desired range. Also, it is preferable that the gauge can be adjusted to a zero point, so that the pointer 68, in the gauge shown, can be set at zero when the blocks 20 and 25 are spaced a predetermined distance.

When the apparatus 10 is to be used, for checking the outside diameters of bushings, for example, a cylindrical "master" bushing of known diameter is placed in the cradle formed by the members 23 and 27, the diameter of the "master" bushing is that required for the bushing being checked to effect a satisfactory press fitting in the ultimate housing or casing for such bushings. Pressure is then applied to the power element 30 by the valve described previously for forcing the block 25 toward block 20. The master bushing will not yield when the block 25 is urged toward block 20. The gauge 65 is then set at its zero position because the distance between the confronting surfaces of the blocks 20 and 25 will be that which will exist when a bushing of the proper outside diameter is placed between the members 23 and 27 and a predetermined pressure is applied to the bushing. The air pressure to be applied to the power element 30 may be determined by experimentation and different pressures may be required for various types or sizes of bushings being checked. After the gauge 65 is adjusted as described and the air pressure regulator is set to provide the desired air pressure in the bore 40, bushings are then checked by placing them individually in the cradle formed by the members 23 and 27 and causing the block 25 to be urged upward by the power element 30, as described with reference to the "master" bushing.

If, during the time the contracting pressure is applied to the bushings being checked, the gauge 65 indicates that the blocks 20 and 25 are further apart than when the gauge 65 registers zero the operator will know that the outside diameter of the bushing being tested is too large for the bushing to be pressed into its ultimate housing. Likewise, when the gauge indicates that the blocks 20 and 25 are closer together than when the gauge registers zero, the operator will know that the outside diameter of the housing being tested is too small for the bushing to be properly fitted into its ultimate housing.

By using the power element described for moving the block 25, there will be no variation in the force applied to the block as long as the air pressure is constant. After it has once been determined what air pressure should be used for the particular article to be checked, it is unnecessary to further check the force on the block 25 because there will be no variation in the operating characteristics of the power element.

In determining what air pressures should be applied to the power element for various articles to be checked it is desirable to measure the actual force provided by the power element 30, and provision is made for checking this force by a suitable measuring device, such as the Brinell measuring device. For this purpose a rigid plate 70 is attached to the lower ends of the guide rods 16 by bolts 71 and the checking or measuring instrument is inserted between the block 38 and the plate 70, so that the plate 31 will be raised from the stops 37. Air is then applied to the power element and the block 25 moves upwardly until stopped by the article being checked. The pressure then on plate 31 will be equal to the pressure being applied to the article being checked because the plate 31 will be moving freely on the guide rods 16 in a downward direction.

It is apparent from the foregoing that I have provided a novel apparatus for testing the outside dimensions of bushings when predetermined pressures are applied thereto, which apparatus can be easily and quickly operated, giving accurate results and which can be conveniently checked for accuracy.

Although I have shown and described a preferred form of the invention, it is to be understood that other forms may be adopted, falling within the scope of the appended claims.

I claim:

1. In apparatus for checking bushings, or the like, a cradle for receiving the article to be tested, said cradle including two sections, one movable relative to another for exerting contracting pressures on said article; means for indicating the distance between said two sections while said sections exert contracting pressures; opposed end walls and flexible walls intermediate said end walls forming a chamber; supporting means for one of said end walls including guide means along which said one end wall is movable, a stop for limiting movement of one said wall in one direction along said guide means; means for controlling the flow of a fluid to and from said chamber; means interconnecting the other of said end walls with one of said sections; and an abutment carried by said guide means, said abutment being spaced from said one end wall.

2. In apparatus for checking bushings, or the like, a cradle for receiving an article to be checked, said cradle including two sections having surfaces substantially conforming to the outside surface of said article; means for urging said two sections toward one another for applying contracting pressures on said article; and means for indicating the distance between confronting surfaces of said two sections while said contracting pressure is applied, said means including a lever, a floating pivot member carrying the lever, a movement indicator responsive to movement of the pivot member, and means for interconnecting said lever on each side of the pivot therefor with one of said two sections.

3. In apparatus for checking bushings, or the like, a cradle for receiving an article to be checked, said cradle including two sections having surfaces substantially conforming to the outside surface of said article; means for urging said two sections toward one another for applying contracting pressures on said article; and means for indicating the distance between confronting surfaces of said two sections while said contracting pressure is applied, said means including a lever, a floating pivot member carrying the lever, a movement indicator responsive to movement of the pivot member, and means for interconnecting said lever on each side of the pivot therefor with one of said two sections on opposite sides of said cradle, respectively.

4. In apparatus for checking bushings, or the like, a cradle for receiving an article to be checked, said cradle including two sections having surfaces substantially conforming to the outside surface of said article; means for urging said two sections toward one another for applying contracting pressures on said article; and means for indicating the distance between confronting surfaces of said two sections while said contracting pressure is applied, said means including a lever, a floating pivot member carrying the lever and a load member urging said pivot member toward one of said two sections, a movement indicator responsive to movement of the pivot member, and means for interconnecting said lever on each side of the pivot therefor with one of said two sections.

5. In apparatus for testing bushings or the like, a block having a recess shaped to receive a portion of an article to be checked; a second block having a recess shaped to receive another portion of said article, means for urging said blocks toward one another with the recessed portions in registry with one another; a lever carried by one of said blocks; a pivot member for pivotally supporting the lever intermediate the ends thereof; a link for interconnecting one end of the lever with a surface of the other of said blocks adjacent one side of the recess in said block; a second link for interconnecting the other end of said lever with a surface of said other block adjacent said recess at the side of the recess opposite the first mentioned side; a spring for urging said pivot member in a direction to yieldingly urge said lever and links against said other block; and a movement gauge connected with said first member.

6. In apparatus for checking articles, two members engageable with the articles to be checked, one of said members being movable relative to the other for applying pressure to the article being checked; means for indicating the distance between said two members while said members are engaged with said article; means forming a chamber having opposed end walls and flexible walls intermediate said end walls; supporting means for one of said end walls including guide means along which said one end wall is movable, a stop for limiting movement of said one end wall in one direction along said guide means; means for controlling the flow of a fluid to and from said chamber; and means interconnecting the other of said end walls with one of said sections; and an abutment carried by said guide means, said abutment being spaced from said one end wall.

THOMAS J. KAVANAGH.

REFERENCES CITED

The following references are of record in the file of this patent:

UNITED STATES PATENTS

| Number | Name | Date |
|---|---|---|
| 877,139 | Tatarinoff | Jan. 21, 1908 |
| 1,332,570 | Ray | Mar. 2, 1920 |
| 1,540,378 | Wasson | June 2, 1925 |
| 1,559,230 | Eccles | Oct. 27, 1925 |
| 1,611,441 | Higgins | Dec. 21, 1926 |
| 1,777,310 | Hopkinson | Oct. 7, 1930 |
| 2,304,664 | Smith | Dec. 8, 1942 |